(12) United States Patent
Eickhoff

(10) Patent No.: US 11,063,275 B2
(45) Date of Patent: Jul. 13, 2021

(54) RECHARGER FOR HYDROGEN FUEL CELLS

(71) Applicant: Honeywell International Inc., Morris Plains, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1001 days.

(21) Appl. No.: 15/067,348

(22) Filed: Mar. 11, 2016

(65) Prior Publication Data

US 2016/0197368 A1 Jul. 7, 2016

Related U.S. Application Data

(62) Division of application No. 12/722,388, filed on Mar. 11, 2010, now Pat. No. 9,966,615.

(60) Provisional application No. 61/159,254, filed on Mar. 11, 2009.

(51) Int. Cl.
| | |
|---|---|
| *H01M 8/04082* | (2016.01) |
| *H01M 8/065* | (2016.01) |
| *B01J 7/02* | (2006.01) |
| *C01B 3/06* | (2006.01) |
| *H01M 6/50* | (2006.01) |
| *H01M 16/00* | (2006.01) |
| *H01M 6/04* | (2006.01) |
| *H01M 6/14* | (2006.01) |

(52) U.S. Cl.
CPC ........... *H01M 8/04201* (2013.01); *B01J 7/02* (2013.01); *C01B 3/065* (2013.01); *H01M 6/5011* (2013.01); *H01M 6/5077* (2013.01); *H01M 8/065* (2013.01); *H01M 16/006* (2013.01); *H01M 6/04* (2013.01); *H01M 6/14* (2013.01); *H01M 2250/30* (2013.01); *Y02B 90/10* (2013.01); *Y02E 60/36* (2013.01)

(58) Field of Classification Search
CPC ............................ H01M 8/065; H01M 6/5077
See application file for complete search history.

(56) References Cited

U.S. PATENT DOCUMENTS

| | | | |
|---|---|---|---|
| 4,599,867 A | 7/1986 | Retallick | |
| 5,372,617 A | 12/1994 | Kerrebrock et al. | |
| 9,966,615 B2 | 5/2018 | Eickhoff | |
| 2002/0058168 A1 | 5/2002 | Voss et al. | |
| 2004/0086755 A1* | 5/2004 | Kalal | H01M 8/04208 429/422 |

(Continued)

OTHER PUBLICATIONS

"U.S. Appl. No. 12/722,386, Appeal Brief filed Aug. 31, 2015", 29 pgs.

(Continued)

*Primary Examiner* — Miriam Stagg
*Assistant Examiner* — Brent C Thomas
(74) *Attorney, Agent, or Firm* — Schwegman Lundberg & Woessner, P.A.

(57) ABSTRACT

A recharger includes a manifold having an input to couple to a hydrogen generating module and an output port to couple to at least one rechargeable fuel cell. A vacuum pump is coupled to the manifold to evacuate the manifold. A valve is coupled to the manifold between the vacuum pump and the input of the manifold. A controller is coupled to control the vacuum pump and the valve, as well as an optional fan.

7 Claims, 4 Drawing Sheets

(56) References Cited

U.S. PATENT DOCUMENTS

| | | | |
|---|---|---|---|
| 2005/0181245 A1 | 8/2005 | Bonne et al. | |
| 2006/0057061 A1* | 3/2006 | Sandi-Tapia | B82Y 30/00 |
| | | | 423/658.2 |
| 2006/0246177 A1* | 11/2006 | Miki | F17C 5/007 |
| | | | 426/24 |
| 2007/0104996 A1 | 5/2007 | Eickhoff et al. | |
| 2007/0287059 A1* | 12/2007 | Eickhoff | H01M 8/186 |
| | | | 429/62 |
| 2008/0057360 A1 | 3/2008 | Kaye et al. | |
| 2008/0146442 A1* | 6/2008 | Hosoe | B01J 20/02 |
| | | | 502/414 |
| 2009/0104480 A1 | 4/2009 | Machuca et al. | |
| 2009/0311561 A1* | 12/2009 | Rosenzweig et al. | |

OTHER PUBLICATIONS

"U.S. Appl. No. 12/722,388, Advisory Action dated Jun. 7, 2013", 3 pgs.

"U.S. Appl. No. 12/722,388, Advisory Action dated Jul. 5, 2013", 3 pgs.

"U.S. Appl. No. 12/722,388, Advisory Action dated Jul. 8, 2015", 5 pgs.

"U.S. Appl. No. 12/722,388, Examiner Interview Summary dated Jun. 6, 2013", 3 pgs.

"U.S. Appl. No. 12/722,388, Final Office Action dated Mar. 14, 2013", 11 pgs.

"U.S. Appl. No. 12/722,388, Final Office Action dated Apr. 2, 2015", 14 pgs.

"U.S. Appl. No. 12/722,388, Final Office Action dated May 9, 2014", 12 pgs.

"U.S. Appl. No. 12/722,388, Non Final Office Action dated Aug. 6, 2012", 12 pgs.

"U.S. Appl. No. 12/722,388, Non Final Office Action dated Sep. 11, 2014", 13 pgs.

"U.S. Appl. No. 12/722,388, Non Final Office Action dated Oct. 8, 2013", 12 pgs.

"U.S. Appl. No. 12/722,388, Response filed Jan. 8, 2014 to Non Final Office Action dated Oct. 8, 2013", 11 pgs.

"U.S. Appl. No. 12/722,388, Response filed May 14, 2013 to Non Final Office Action dated Mar. 14, 2013", 8 pgs.

"U.S. Appl. No. 12/722,388, Response filed Jun. 2, 2015 to Final Office Action dated Apr. 2, 2015", 17 pgs.

"U.S. Appl. No. 12/722,388, Response filed Jun. 12, 2013 to Advisory Action dated Jun. 7, 2013", 10 pgs.

"U.S. Appl. No. 12/722,388, Response flied Jul. 15, 2013 to Response to Advisory Action dated Jul. 5, 2013", 11 pgs.

"U.S. Appl. No. 12/722,388, Response filed Aug. 8, 2014 to Final Office Action dated May 9, 2014", 12 pgs.

"U.S. Appl. No. 12/722,388, Response filed Nov. 6, 2012 to Non Final Office Action dated Aug. 6, 2012", 7 pgs.

"U.S. Appl. No. 12/722,388, Response flied Dec. 11, 2014 to Non Final Office Action dated Sep. 11, 2014", 14 pgs.

"U.S. Appl. No. 12/722,386, Appellant's Reply Brief filed Apr. 18, 2016 in response to Examiner's Answer dated Feb. 18, 2016", 11 pgs.

"U.S. Appl. No. 12/722,388, Appeal Decision dated Oct. 30, 2017", 9 pgs.

"U.S. Appl. No. 12/722,388, Examiner's Answer dated Feb. 18, 2016", 16 pgs.

"U.S. Appl. No. 12/722,386, Communication filed Apr. 3, 2018 in response to Examiner's Reasons for Allowance", 1 pg.

"U.S. Appl. No. 12/722,388, Notice of Allowance dated Jan. 25, 2018", 8 pgs.

"U.S. Appl. No. 12/722,388, PTO Response to Rule 312 Communication dated Apr. 3, 2018", 2 pgs.

* cited by examiner

RECHARGER FOR HYDROGEN FUEL CELLS

RELATED APPLICATION

This application is a divisional of U.S. patent application Ser. No. 12/722,388, filed Mar. 11, 2010, which claims priority to U.S. Provisional Application Ser. No. 61/159,254 (entitled Lightweight Recharger for Hydrogen Fuel Cells, filed Mar. 11, 2009) which is incorporated herein by reference.

BACKGROUND

State of the art primary batteries do not provide adequate run time in portable electronic devices. Soldiers typically carry several pounds of batteries per day in the field, which on multi-day missions becomes a substantial portion of their total load. The US Army plans to transition from using individual batteries in each device the soldier carries, to larger, higher-power central power sources which would take advantage of the superior energy density and specific energy of larger fuel cell based power sources. This transition will not happen immediately, and in the mean time, better, longer lasting "batteries" are desired to ease the burden on the soldier.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
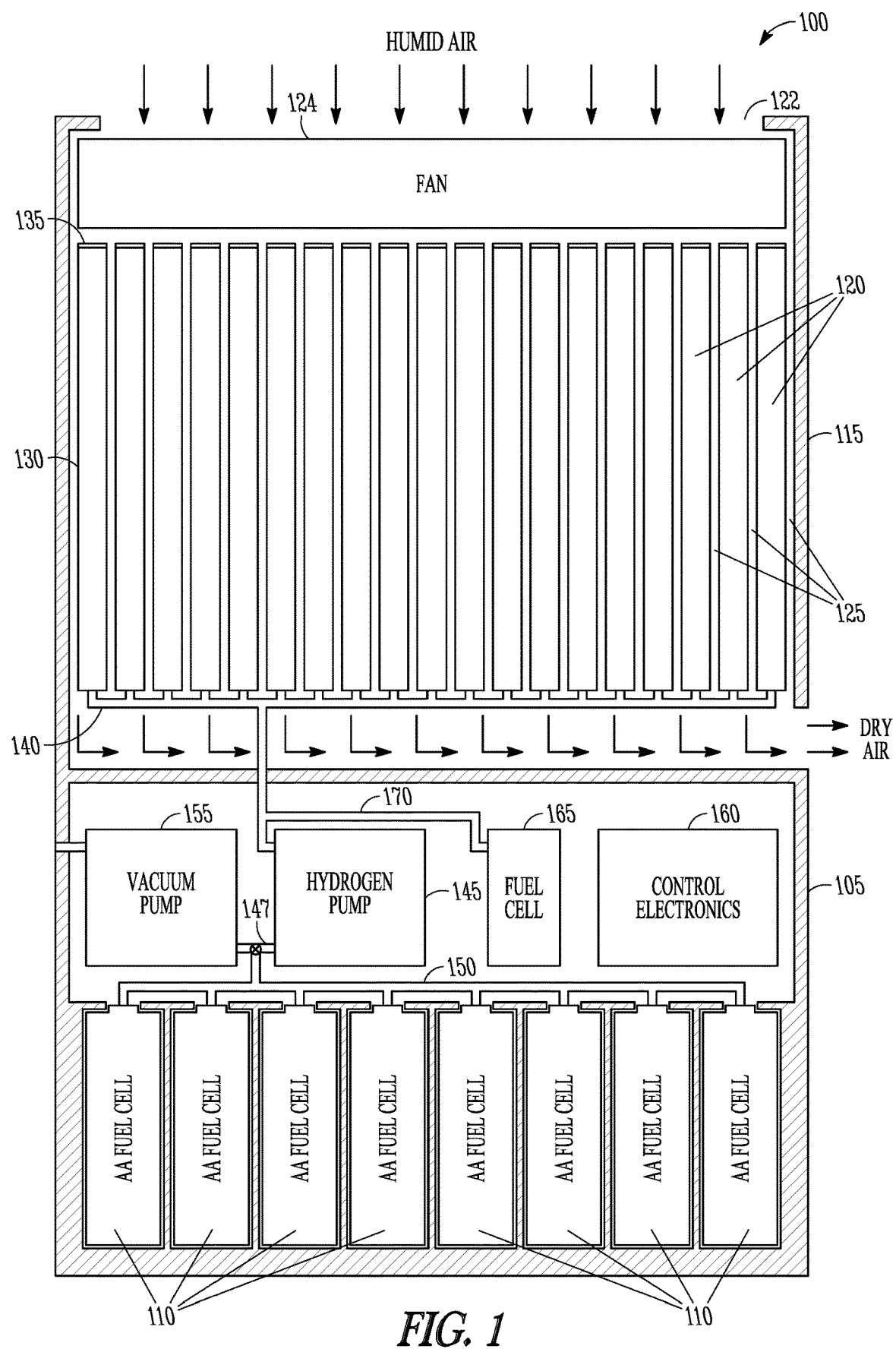
FIG. 1 is a block diagram of a recharging, system for hydrogen fuel cell generators according to an example embodiment.

In one embodiment, a recharging system 100 is illustrated in block diagram form in FIG. 1 consists of a central hydrogen fuel cell recharger 105, and rechargeable fuel cells 110 in the form factors of primary alkaline and lithium batteries. Recharging system 100 in one embodiment provides a power solution in one embodiment, providing a high energy density system for recharging batteries. The rechargeable fuel cells 110 provide three to five times the energy density and run time of current alkaline and lithium batteries, but instead of being discarded at the end of life, they can be recharged with hydrogen by the recharger.

Use of the recharger 105 in conjunction with rechargeable fuel cells 110 may provide a power solution with dramatically improved run time, reduced weight, and lower cost. In one embodiment, a chemical hydride fuel source 115 such as LiAlH4 reacts spontaneously with water to generate hydrogen. The fuel source 115 in one embodiment includes multiple fuel rods 120. Ambient air with some level of humidity contains water vapor, and is circulated over fuel rods 120 via an ambient air inlet 122. A dry air outlet 123 may be used to provide an outlet for air that has passed over the fuel rods 120. Together, the ambient air inlet 122 may be positioned at one end of the fuel rods, with the dry air outlet 123 positioned at a second end of the fuel rods 120, to promote flow of humid air over the fuel rods. An optional fan 124 may be used at either the inlet 122 or outlet 123 to further promote such flow.

The fuel rods 120 are packed together in one embodiment, such that channels 125 are disposed between the fuel rods 120. The fuel rods 120 may include a LiAlH4 core, with a selectively permeable membrane (SPM) shell 130 that may surround each entire fuel rod, or a group of fuel rods in further embodiments. The fuel rods 120 may have a gas impermeable cap 135 on an end of the fuel rods that are closest to the ambient air inlet 122. The SPM shell 130 allows water vapor diffusion but prevents hydrogen diffusion. Water vapor from the humid air diffuses through the SMP shell 130 and reacts with the LIALH4, generating hydrogen. In further embodiments, fuel source 115 may be formed as a solid block with channels to disperse the humid air throughout the fuel source 115.

The generated hydrogen flows out the bottom of the fuel source 115, such as fuel rods 120 into an input manifold 140, which is coupled to a hydrogen pump 145. An outlet 147 of the hydrogen pump 145 is coupled to an output manifold 150 which has individual gas carrying connections to each rechargeable fuel cell 110. A vacuum pump 155 may also be connected to the manifold 150 and hence to the fuel cells 110, and is used to evacuate the fuel cells 110 and test their integrity. In one embodiment, the fuel cells are evacuated to a pressure below 1 torr. Evacuation is done to remove gases oxygen, water vapor, nitrogen, and left over hydrogen) that might cause problems with operation of the fuel cell.

Hydrogen from the fuel rods 120 is pumped into the fuel cells 110 via the manifolds 140, 150, and hydrogen pump 145, to refill or recharge them with hydrogen. Control electronics 160, which may be powered by a separate fuel cell 165, manages the vacuum and hydrogen pumps, as well as an optional fan 124. The separate fuel cell 165 may also be used to provide power to the pumps and fan and other elements that may require power, such as various valves to aid in performing recharging operations described below. In one embodiment, the separate fuel cell 165 is coupled to the manifold 140 via a gas line 170.

Figure 2:
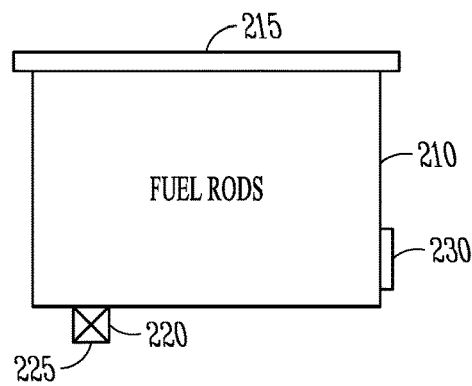
FIG. 2 is a block diagram of a replaceable fuel source module according to an example embodiment.

An example replaceable fuel source module 210 is shown in block diagram form in FIG. 2. The module 210 may include one or more fuel rods or other source of water released hydrogen as described above. It may be transported with a cover 215 to block ambient air from reaching the fuel rods until the module is ready for use to generate hydrogen. The module 210 includes a hydrogen outlet port 220 that includes a valve 225 to prevent ambient air from reaching the fuel rods. The port 220 may mate with the manifold 140 in FIG. 1. The valve 225 may be automatically opened by insertion of the port 220 into the manifold 140 in one embodiment, or may be controlled by electronics 160 in various embodiments. A dry air outlet cover 230 may be used to cover the dry air outlet and to prevent ambient from reaching the fuel rods. The cover 230 may be removed when the module 210 is to be used to generate hydrogen during recharging processes. In some embodiments, the module 210 may be removed after a recharging process, and the covers 215 and 230 replaced, to store the module 210 between uses. In further embodiments, covers 215 and 230 include valves that may be actuated via electronics 160 in recharger 105 when module 210 is coupled to the recharger 105.

Figure 3:
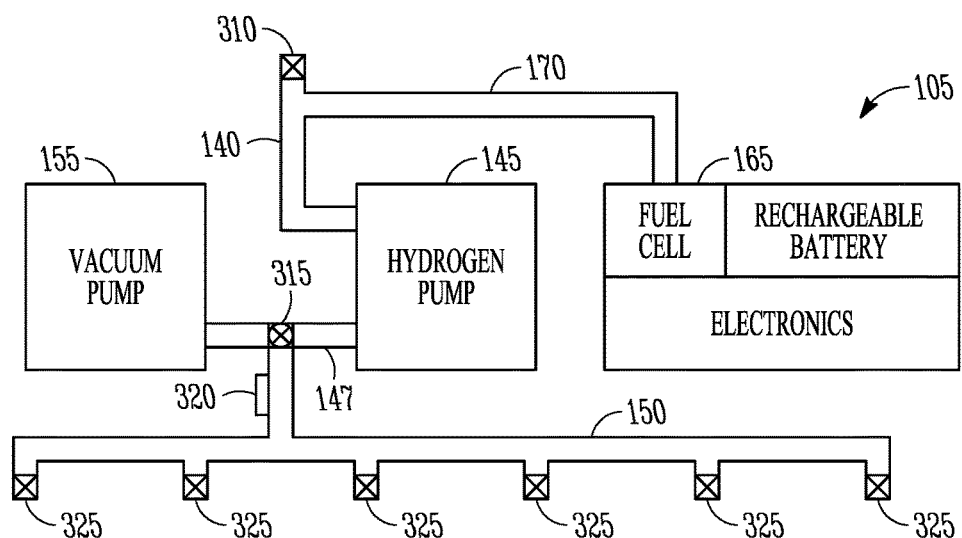
FIG. 3 is a block diagram illustration showing further details of the recharger according to an example embodiment.

FIG. 3 is a block diagram illustration showing further details of the recharger 105, with reference numbers consistent with those used in FIG. 1. Recharger 105 includes a portion of manifold 140, and may also include a valve 310 operating under control of electronics 160 in one embodiment. Valve 140 may be used to stop hydrogen flow, and seal off the portion of manifold 140 in recharger 105 from the fuel source. Outlet 147 is coupled via a valve 310 to the vacuum pump 155. The valve 310 may be coupled at the point outlet port 147 couples to manifold 150, and may be controlled by electronics 160 to regulate flow between vacuum pump 155, hydrogen pump 145 and manifold 150. A pressure sensor 320 is coupled to manifold 150 to measure pressure in manifold 150 at selected times during a recharging process. A further fuel cell valve 325 may be included in each path to a fuel cell to be recharged in one embodiment. The fuel cell valves 325 may be used to select individual fuel cells to the manifold in a controlled manner. Using pressure sensor 320 and valves 315 and 325, each individual fuel cell may be vacuum tested for damage, or individually measured to determine if they are full of hydrogen.

In a further embodiment, fuel cell 165 may be coupled to a rechargeable battery 330. The rechargeable battery may be a standard battery that retains charge over an extended period of time, and provides a backup power source for electronics 160 and the assorted fans, pumps and valves in various embodiments. Battery 220 may be charged via the fuel cell 165 generating electricity when it is supplied hydrogen. Battery 220 may then be used to power the electronics during a recharging process prior to fuel cell 165 receiving hydrogen. It may also be used as a backup power source should fuel cell 165 become inoperative. It should be noted that while electronics 160 is shown as a single module, the functions it performs may be distributed in any desired manner throughout the system. In still further embodiments, a regular battery 220 may be used, or the recharger 105 may be adapted to plug into an external power source, such as a power outlet coupled to the power grid or an automobile lighter receptacle.

Figure 4:
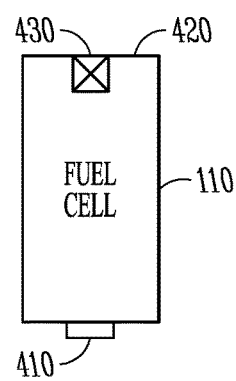
FIG. 4 is a block diagram of a rechargeable fuel cell according to an example embodiment.

FIG. 4 illustrates a rechargeable fuel cell 110 in further detail. In one embodiment, the fuel cell 110 is in the shape of an AA battery form factor, having a cathode 410 and an anode 420. In one embodiment, the anode 420 end of the fuel cell 110 includes a valve 430, that upon inserting of the fuel cell into the recharger 105, the valve 430 mates with the manifold 150, causing the valve 430 to open and allow hydrogen to flow into the fuel cell 110 and be absorbed.

Figure 5:
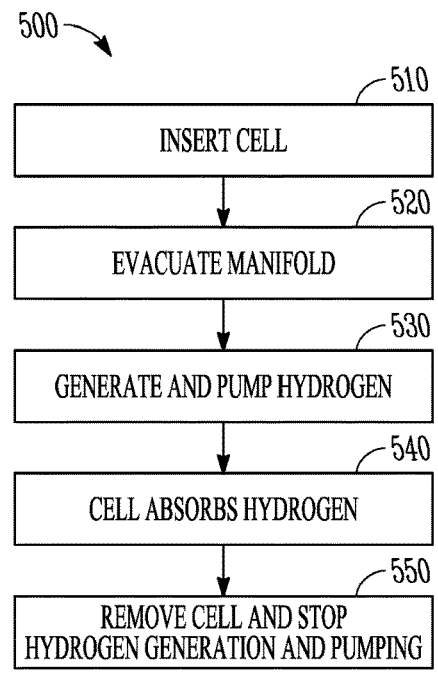
FIG. 5 is a flow chart diagram of a charging process according to an example embodiment.

A simple charging process is indicated in flow chart form at 500 in FIG. 5. The process may be performed by a combination of human interactions and recharger processing in various embodiments. At 510, one or more fuel cells may be inserted such that they are coupled to the manifold 150 in a sealed manner. The vacuum pump 155 may be used to evacuate the manifold 150 and the cells. The valves may be controlled in a manner to facilitate such evacuation. In one embodiment, the pressure sensor may be used to determine if one or more fuel cells has failed, or if the recharger 105 is otherwise leaking. The cells may be individually tested for leaks in a further embodiment using the valves to isolate them. At 520, hydrogen generation is performed and the hydrogen is pumped into manifold 150. The cells absorb the hydrogen as indicated at 540. Upon completion of charging, the cell may be removed, and hydrogen generation and pumping stopped.

Figure 6:
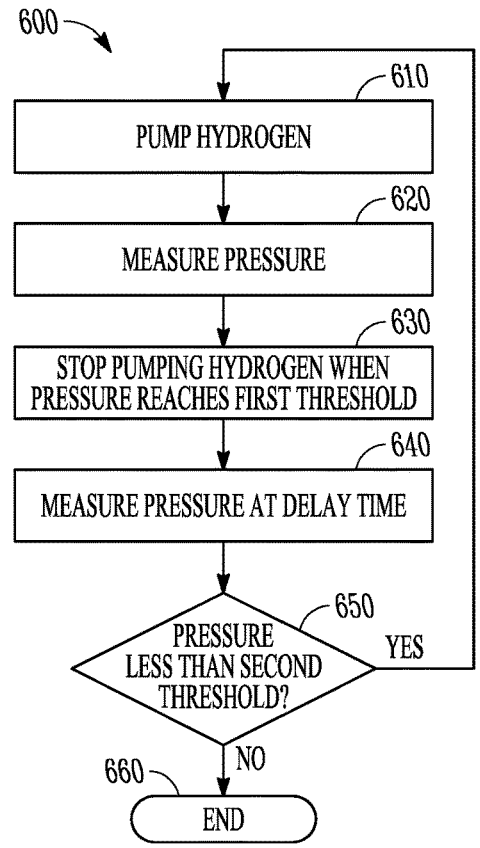
FIG. 6 is a flow chart representation of a further process for charging rechargeable fuel cells according to an example embodiment.

FIG. 6 is a flow chart representation of a further process 600 for charging rechargeable fuel cells. Once one or more fuel cells have been coupled to manifold 150, hydrogen may be pumped into the fuel cells. Pressure in manifold 150 may then be measured at 620, with pumping stopped at 630 when the pressure reaches a first threshold. The first threshold may be a predetermined pressure that is consistent with a desired level of charging a particular type of rechargeable fuel cell. Some hydrides may utilize a higher pressure, which varies from a few PSI above atmosphere to one hundred of more PSI. At 640, after a desired delay time, the pressure is measured again. If more hydrogen has been absorbed, the pressure may have dropped from the first threshold. A second threshold, selected to indicate that the fuel cell may not be fully charged, is used to determine at 650 whether to pump hydrogen again at 610 and repeat the process until the pressure does not drop to the second threshold after a predetermined amount of time.

Figure 7:
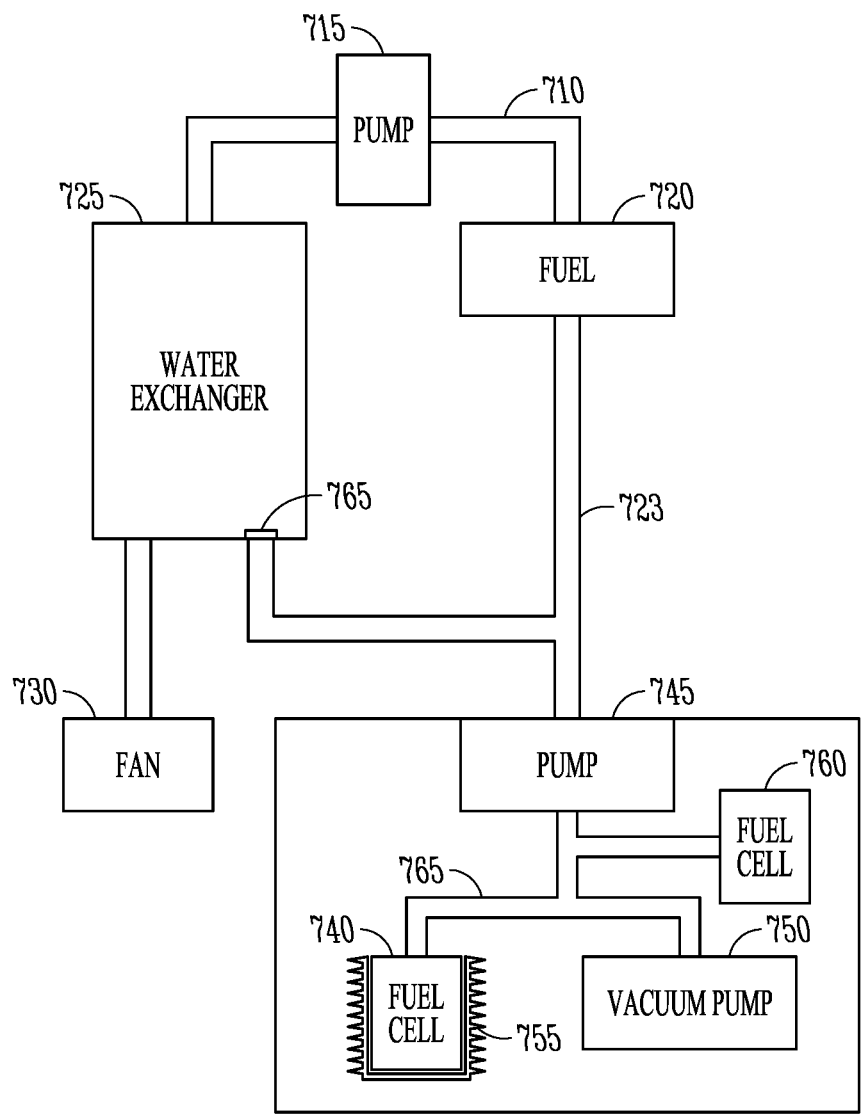
FIG. 7 is a block diagram of an alternative fuel cell recharger according to an example embodiment.

In an alternative embodiment as illustrated in a simplified block diagram in FIG. 7, a hydrogen stream 710 containing water vapor is circulated via a pump or fan 715 through an arrangement of $LiAlH_4$ fuel rods 720. The fuel rods 720 react with the water vapor in the hydrogen stream 710, producing more hydrogen. Once dried by the fuel rods, the hydrogen 723 is passed by a "water exchanger" which consists of water vapor/hydrogen selectively permeable membranes 725 (membranes such as Nafion® may be suitable), which allow water vapor from ambient air to permeate the membrane into the hydrogen stream, without losing substantial amounts of hydrogen. A fan 730 may be used to circulate humid ambient air over the air side of the "water exchanger". A hydrogen permeable, water impermeable membrane 735 may be used at an inlet to the water exchanger 725 to prevent water from reaching the hydrogen 723. Hydrogen 723 produced by the hydrogen generator may be fed through an outlet port 735 and attached directly to a rechargeable fuel cell 740. A pump 745 may be used to control the pressure of hydrogen fed to the fuel cell 740. A vacuum pump 750 may be used to remove contaminant gases such as water vapor or oxygen from the fuel cell 740 prior to filling with hydrogen. The fuel cell 740 may be held by a heat sink 755 during recharging to remove the heat generated during refueling, resulting in a more rapid refueling process.

In a further embodiment, a fuel cell 760 is coupled to receive hydrogen produced by the hydrogen generator and provide power to one or more of the pumps, fans and control electronics. The fuel cell may be separate from the rechargeable fuel cells supported in a manifold 765, and need not have a separate hydrogen producing fuel. It may receive hydrogen directly from the hydrogen generate to generate the power. In one embodiment, it may be located prior to a hydrogen pump in the manifold, or located within a fuel container proximate the rods, but coupled to receive hydrogen via conduits from the fuel rods coupled to the outlet port and to receive oxygen to react with the hydrogen.

Alternately, the fuel could be arranged in a series of fins as on a heat exchanger, where the selectively permeable membrane acts as the surface of the fin, creating a large surface area for passive transport of water vapor from the surrounding air into the hydrogen generator. The hydrogen generator then produces hydrogen at a pressure greater than atmospheric pressure. In this way the hydrogen generator could be entirely passive, consuming no electrical power. Hydrogen at the pressure inside the hydrogen generator would be fed directly into the fuel cell.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
receiving a plurality of individual removable hydrogen-rechargeable fuel cells within a manifold within a fuel cell recharger, the fuel cell recharger manifold configured to receive a plurality of the plurality of fuel cells, each of the plurality of fuel cells including a hydrogen fuel cell and a hydrogen storage chamber;
opening a plurality of independently actuated valves at multiple output ports of the manifold of the fuel cell recharger, each of the plurality of independently actuated valves independently controlled by control electronics, each of the plurality of independently actuated valves corresponding to each of the plurality of the plurality of fuel cells;
evacuating the plurality of fuel cells and the manifold to which the plurality of fuel cells are coupled;
generating hydrogen from a hydrogen generator coupled to the manifold;
recharging the plurality of fuel cells with the generated hydrogen;
measuring pressure in the manifold while recharging; and
stopping the recharging when the pressure reaches a first predetermined threshold.

2. The method of claim 1, further including:
waiting a predetermined amount of time following stopping the recharging;
measuring pressure in the manifold following the predetermined amount of time; and
recharging the plurality of fuel cells if the pressure is below a second predetermined threshold.

3. The method of claim 2, wherein the second predetermined threshold is lower than the first predetermined threshold, and wherein the method following evacuation of the plurality of fuel cells and manifold is repeated until the pressure measured after the predetermined amount of time is greater than the second threshold.

4. The method of claim 1, further including measuring pressure in the manifold while evacuating to determine whether at least one of the plurality of fuel cells have failed.

5. The method of claim 1, further including individually vacuum testing each of the plurality of fuel cells, the vacuum testing of each of the plurality of fuel cells including:
closing a plurality of independently actuated output valves on the manifold to which the plurality of fuel cells are coupled;
opening a selected independently actuated output valve on the manifold to which a selected one of the plurality of fuel cells is coupled;
evacuating the manifold and the selected one of the plurality of fuel cells;
measuring pressure in the manifold and in the selected one of the plurality of fuel cells while evacuating to determine whether the selected one of the plurality of fuel cells has failed.

6. The method of claim 1, further including measuring pressure in the manifold following stopping the recharging to determine whether at least one of the plurality of fuel cells has failed.

7. The method of claim 1, further including individually pressure testing each of the plurality of fuel cells, the pressure testing of each of the plurality of fuel cells including:
closing a plurality of independently actuated output valves on the manifold to which the plurality of fuel cells are coupled;
opening a selected independently actuated output valve on the manifold to which a selected one of the plurality of fuel cells is coupled;
measuring pressure in the manifold and in the selected one of the plurality of fuel cells following stopping the recharging to determine whether the selected one of the plurality of fuel cells has failed.

* * * * *